(12) United States Patent
Rajagopal et al.

(10) Patent No.: US 8,457,560 B2
(45) Date of Patent: Jun. 4, 2013

(54) APPARATUS AND METHOD FOR INTERFERENCE MINIMIZATION IN BODY AREA NETWORKS USING LOW DUTY CYCLE AND PREAMBLE DESIGN

(75) Inventors: Sridhar Rajagopal, Plano, TX (US);
Kiran Bynam, Bangalore (IN);
Jianzhong Zhang, Irving, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 696 days.

(21) Appl. No.: 12/689,156

(22) Filed: Jan. 18, 2010

(65) Prior Publication Data

US 2010/0255780 A1  Oct. 7, 2010

Related U.S. Application Data

(60) Provisional application No. 61/212,031, filed on Apr. 6, 2009.

(51) Int. Cl.
*H04B 1/00* (2006.01)

(52) U.S. Cl.
USPC ... 455/63.1; 455/63.3; 455/114.2; 455/278.1; 375/285

(58) Field of Classification Search
USPC ............... 455/63.1, 63.3, 114.2, 278.1, 296, 455/41.2; 375/285, 316
See application file for complete search history.

(56) References Cited

U.S. PATENT DOCUMENTS

| | | | |
|---|---|---|---|
| 6,340,932 B1 * | 1/2002 | Rodgers et al. | 340/572.7 |
| 6,362,737 B1 * | 3/2002 | Rodgers et al. | 340/572.1 |
| 6,711,380 B1 * | 3/2004 | Callaway, Jr. | 455/41.2 |
| 7,254,202 B2 * | 8/2007 | Cattaneo et al. | 375/354 |
| 7,362,817 B2 * | 4/2008 | Ojard | 375/285 |
| 7,362,829 B2 * | 4/2008 | Ojard | 375/346 |
| 7,440,484 B2 * | 10/2008 | Schmidl et al. | 375/135 |
| 7,830,995 B2 * | 11/2010 | Ojard | 375/346 |
| 8,036,259 B2 * | 10/2011 | Zhen et al. | 375/219 |
| 2002/0003812 A1 * | 1/2002 | Haartsen | 370/474 |
| 2005/0013386 A1 * | 1/2005 | Ojard | 375/316 |
| 2005/0013387 A1 * | 1/2005 | Ojard | 375/316 |
| 2006/0227740 A1 * | 10/2006 | McLaughlin et al. | 370/329 |
| 2009/0109953 A1 * | 4/2009 | Tsang et al. | 370/350 |
| 2009/0233554 A1 * | 9/2009 | Cordeiro et al. | 455/63.1 |
| 2009/0323771 A1 * | 12/2009 | Zhen et al. | 375/141 |
| 2010/0123560 A1 * | 5/2010 | Nix et al. | 340/10.4 |
| 2011/0064420 A1 * | 3/2011 | Rajagopal et al. | 398/154 |
| 2011/0255453 A1 * | 10/2011 | Roh et al. | 370/310 |
| 2012/0119902 A1 * | 5/2012 | Patro et al. | 340/502 |

* cited by examiner

*Primary Examiner* — Minh D Dao

(57) ABSTRACT

A device is adapted for use in a body area network capable of low power communications wherein a number of piconets can operate within close proximity. The device is configured to couple to a plurality of secondary devices in a piconet. The device uses an interference mitigation technique to enable the devices in the piconet to use the same frequency and same time as a number of adjacent piconets located in close proximity to the piconet. The interference mitigation technique is at least one of a low duty cycling operation; and a preamble sequence designed to operate under interference.

20 Claims, 13 Drawing Sheets

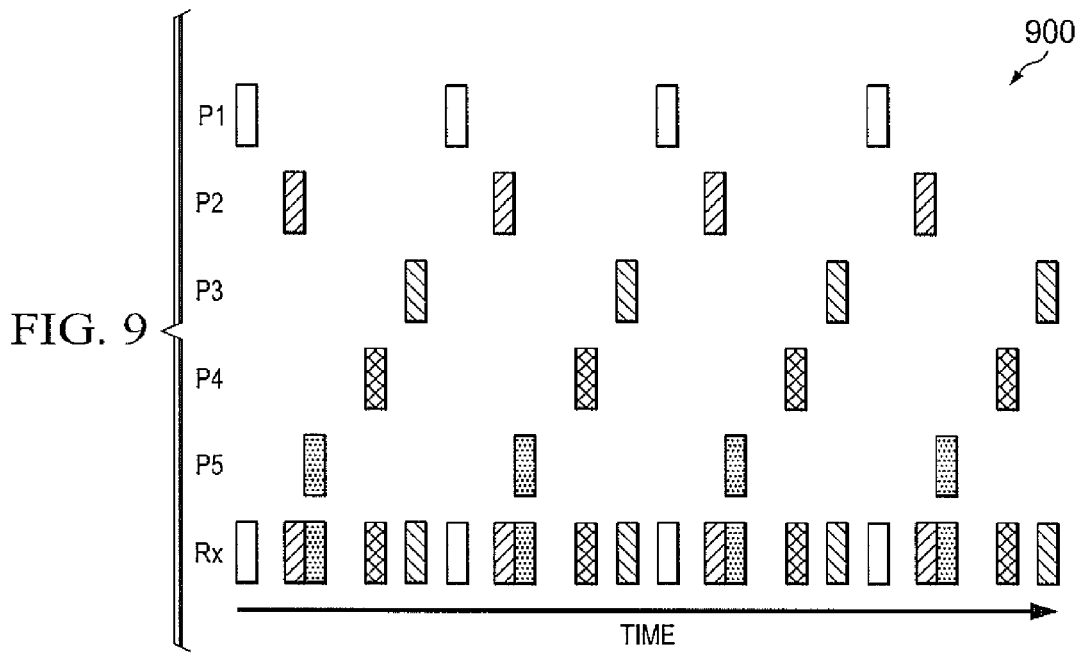
FIG. 9
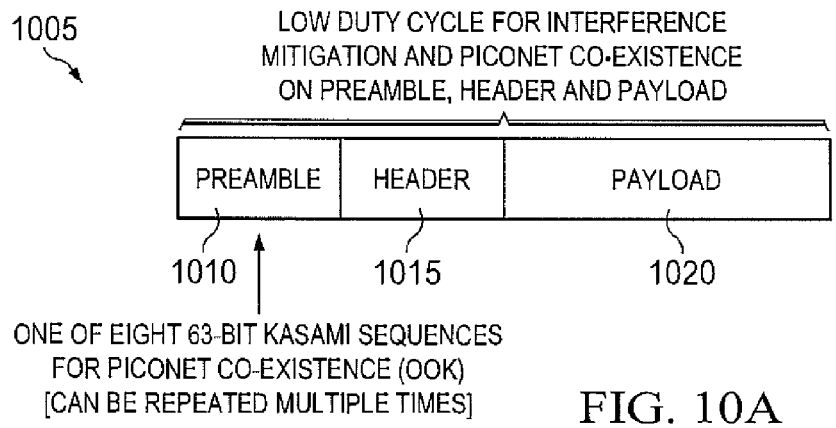
FIG. 10A
```
1030
1111110101011001101110110100100111000101111001010001100001000000
0001100010010010001011000110011110011001010111000110101010010
1000111110111100011100001101111011101011101110011010000010011001
0100010000101011010111101000001001010010110010110100010011111100
1010000111100000110010011010110000001100111001000110110000111110
1101001100000101000000100011101100100000000101110100011110110111
011010100111011111100111111100001101011000000011010011110111
0011011011001110100101010001010101111100100101111111011000101
```
FIG. 10B

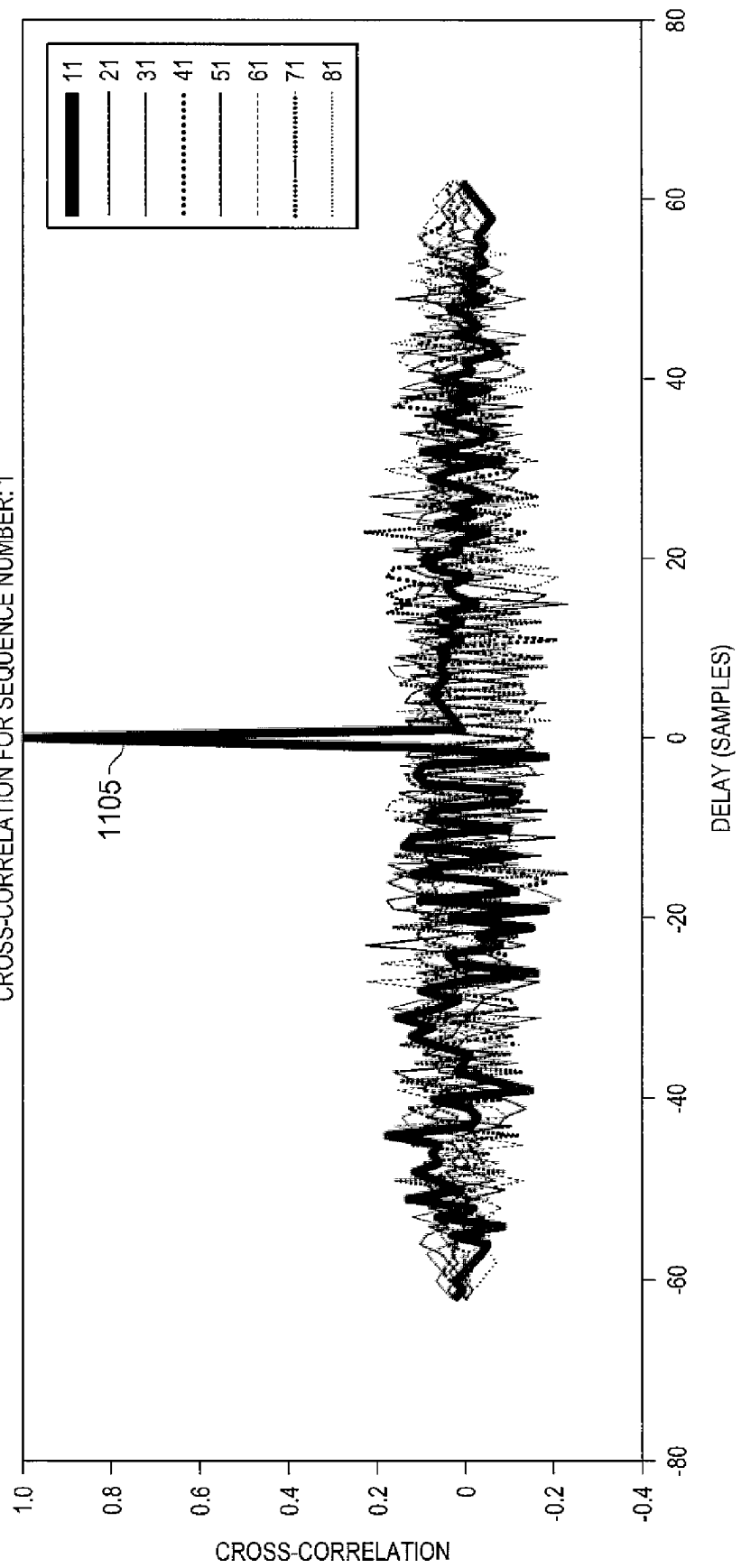

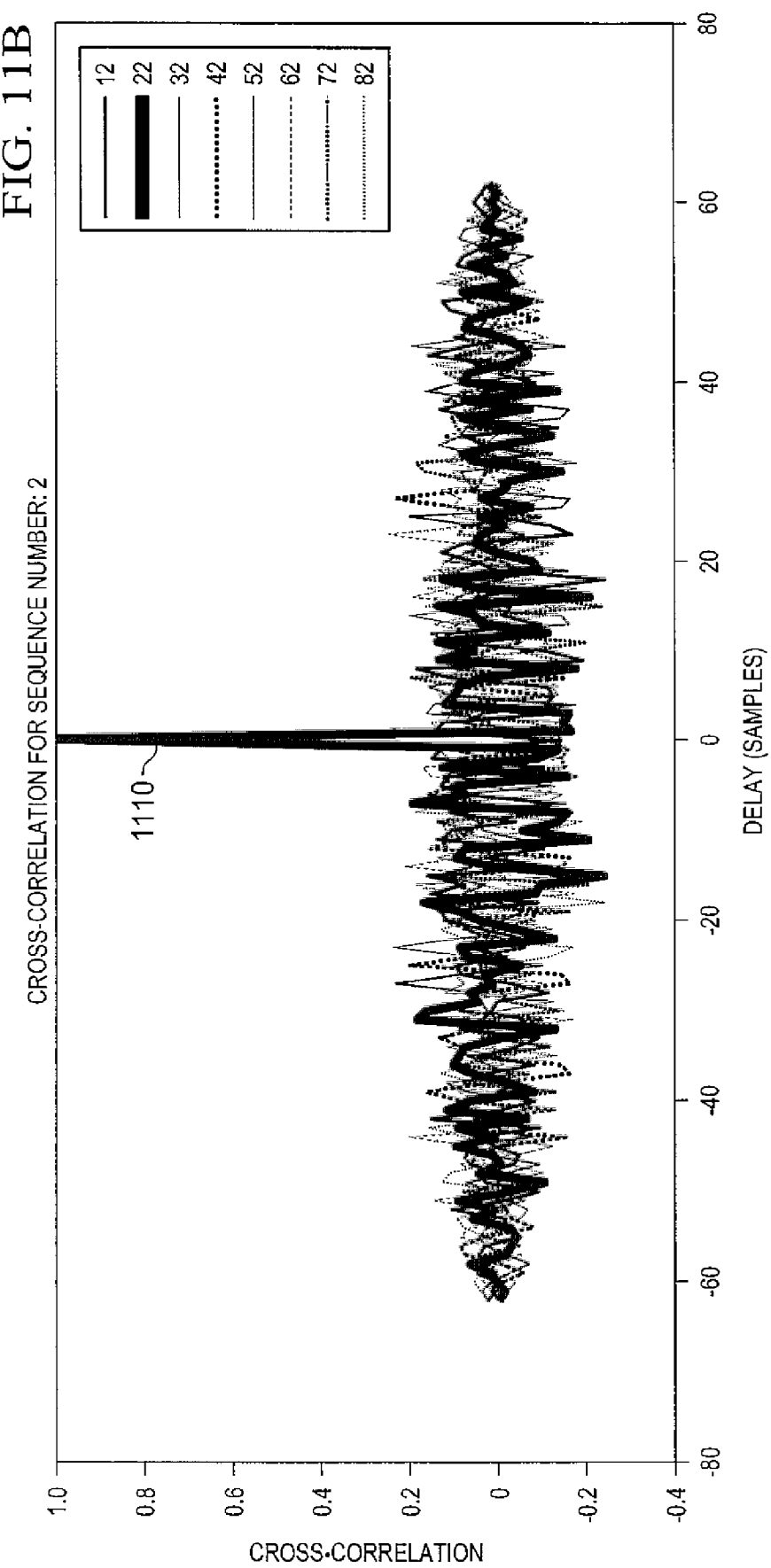

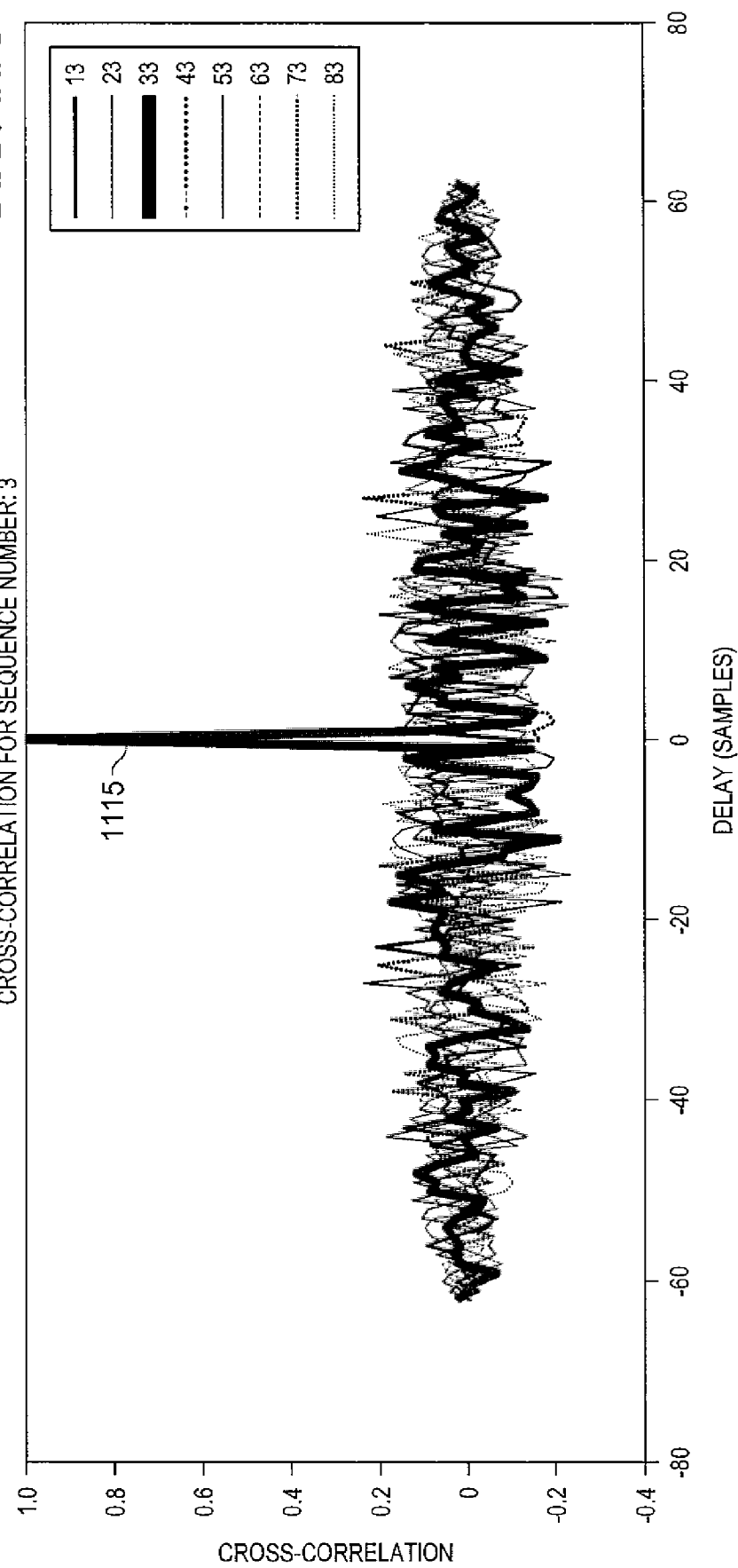

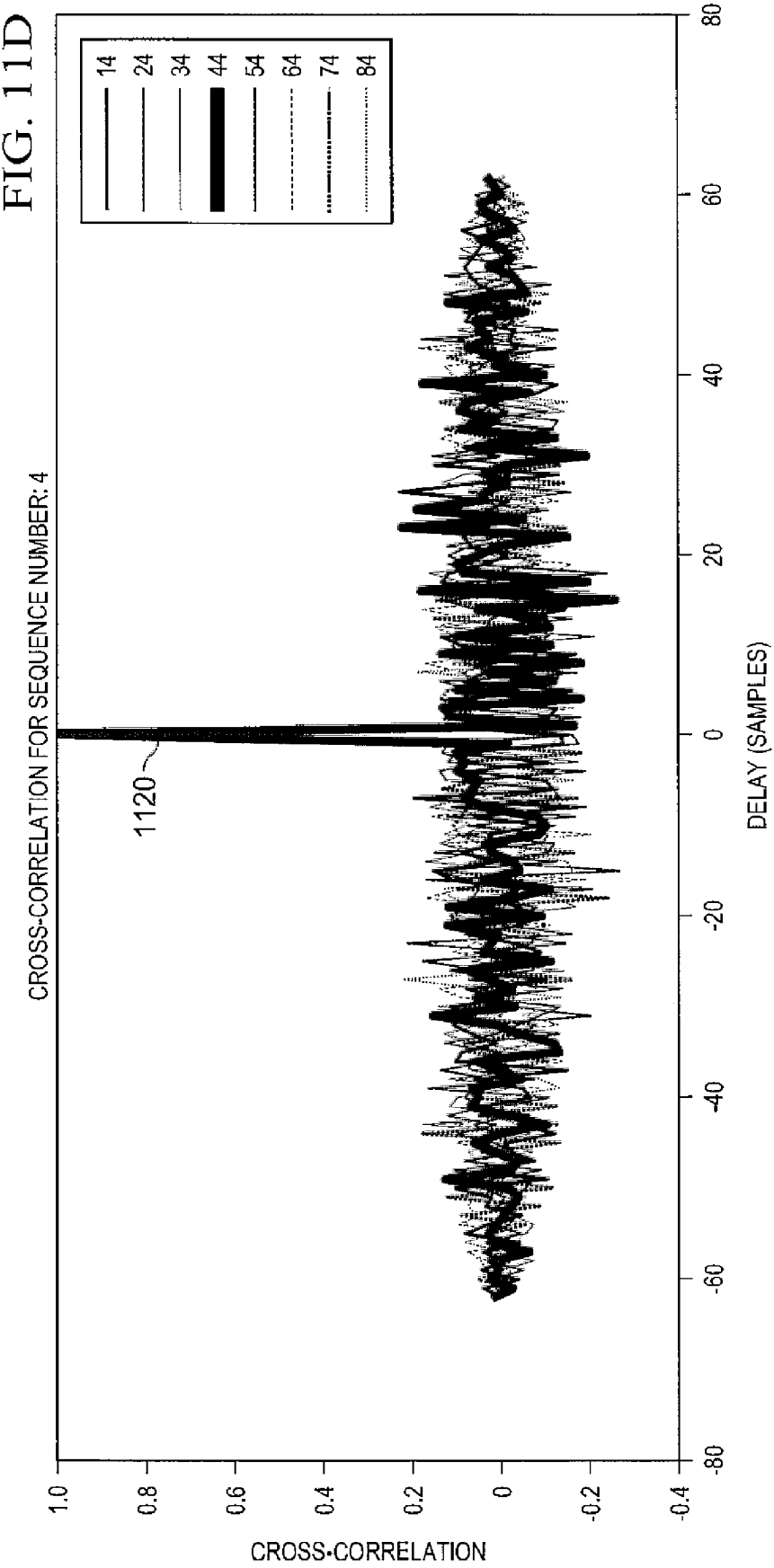

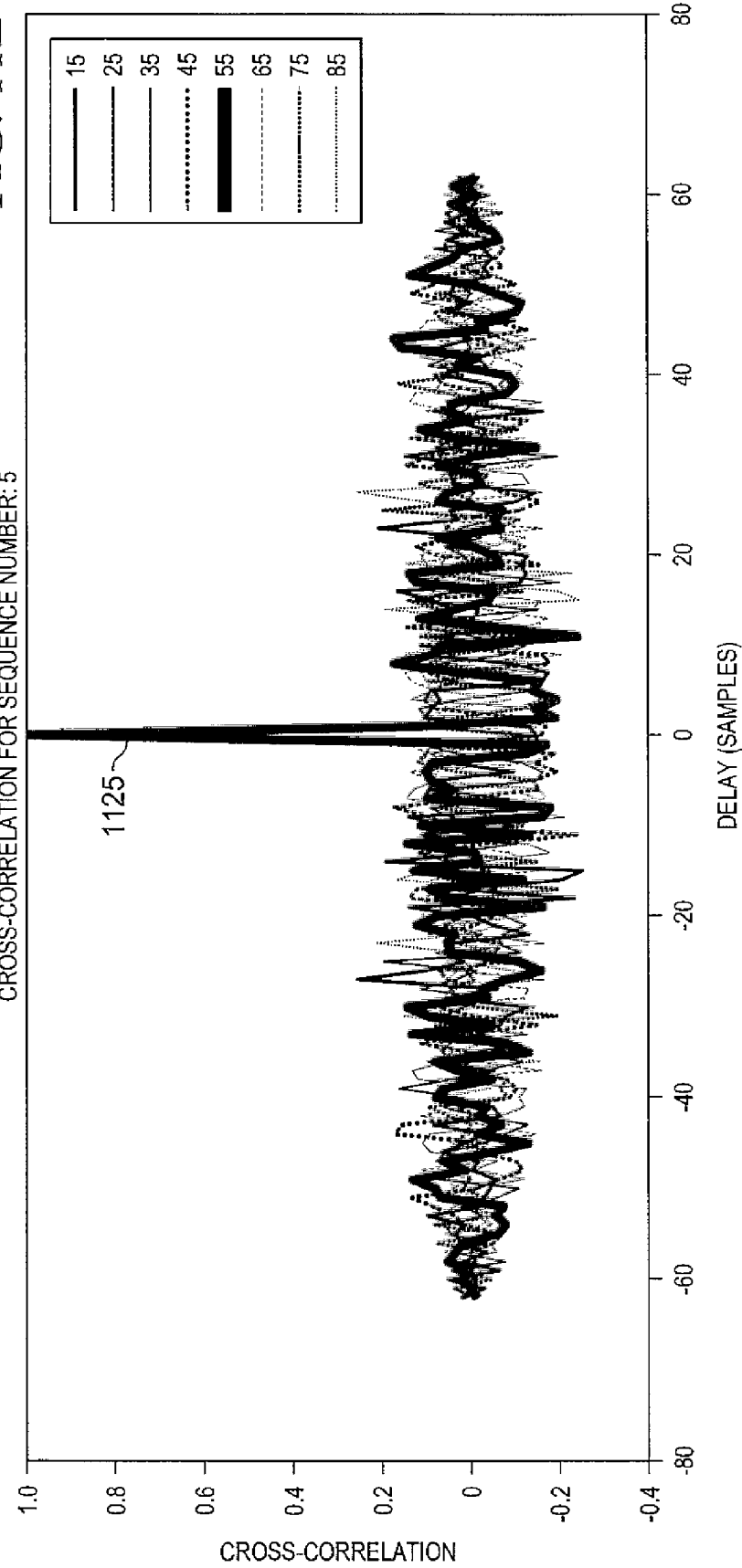

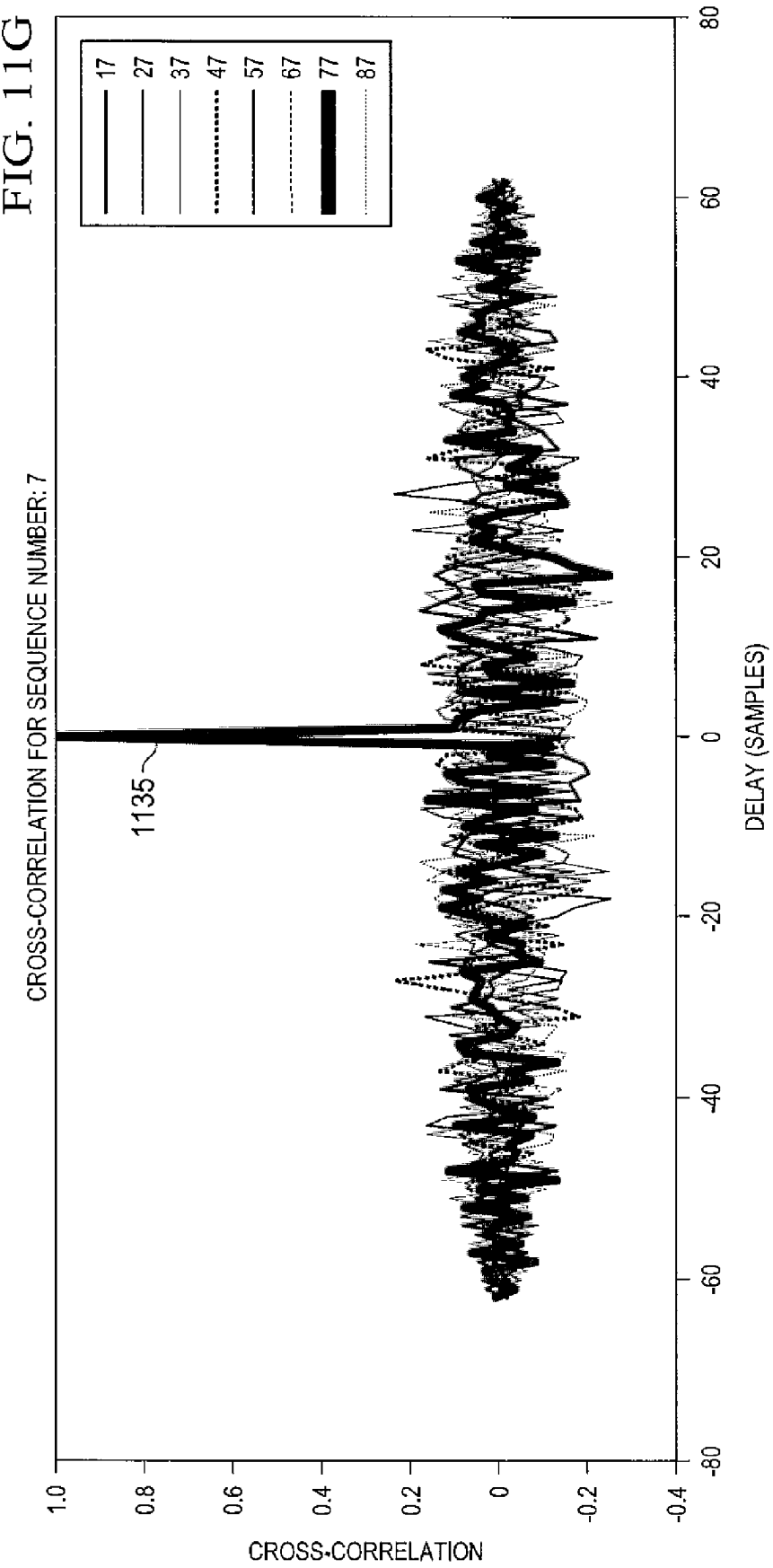

APPARATUS AND METHOD FOR INTERFERENCE MINIMIZATION IN BODY AREA NETWORKS USING LOW DUTY CYCLE AND PREAMBLE DESIGN

CROSS-REFERENCE TO RELATED APPLICATION(S) AND CLAIM OF PRIORITY

The present application is related to U.S. Provisional Patent Application No. 61/212,031, filed Apr. 6, 2009, entitled "PREAMBLE DESIGN FOR SIMULTANEOUSLY OPERATING PICONETS FOR UWB-BASED BODY AREA NETWORKS". Provisional Patent Application No. 61/212,031 is assigned to the assignee of the present application and is hereby incorporated by reference into the present application as if fully set forth herein. The present application hereby claims priority under 35 U.S.C. §119(e) to U.S. Provisional Patent Application No. 61/212,031.

TECHNICAL FIELD OF THE INVENTION

The present application relates generally to body area networks and, more specifically, to an apparatus, system and method for substantially simultaneously operating piconets for UWB-based Body Area Networks.

BACKGROUND OF THE INVENTION

A Body Area Network (BAN) is a short-range communication network including multiple devices on or near a body. The short-range communication network can include one or more devices located up to three meters (3 m) apart. The devices can be located on a human body. The devices serve a variety of applications such as, for example, medical, personal fitness devices, consumer electronics and personal entertainment.

SUMMARY OF THE INVENTION

A device for use in a body area network capable of low power communications is provided. The device includes a controller configured to couple to at least one secondary device. The device and the secondary device are coupled together in a first piconet. The device also includes a transmitter configured to communicate with the secondary device via a wireless communication channel. The controller is configured to perform an interference mitigation technique. The interference mitigation technique can be either a low duty cycling operation, at least one preamble sequence designed to operate under interference, or both.

An apparatus for use in a body area network is provided. The body area network includes a plurality of devices capable of low power communications. The apparatus includes a processor configured to pair a first device with at least one secondary device. The first device and the secondary device are paired in a first piconet. The apparatus is adapted to couple to a transceiver configured to communicate with the secondary device via a wireless communication channel. The processor is configured to perform an interference mitigation technique. The interference mitigation technique can be either a low duty cycling operation, at least one preamble sequence designed to operate under interference, or both.

A method of operating a piconet for use in a body area network capable of low power communications is disclosed. The method includes communicating, by a central device, with at least one paired device in the piconet. The method also includes operating in close proximity with a second device located in an adjacent piconet when the piconet and the adjacent piconet share the same frequency and same time. The method further includes performing an interference mitigation technique configured to reduce a probability that communications in the adjacent piconet will interfere with communications in the piconet. The interference mitigation technique can be either a low duty cycling operation, at least one preamble sequence designed to operate under interference, or both.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9 illustrates a timing offset for coexistence of a number of piconets operating within the same time and bandwidth according to embodiments of the present disclosure;

FIG. 10A illustrates eight preamble codes based on a Kasami code according to embodiments of the present disclosure;

FIG. 10B illustrates a packet structure according to embodiments of the present disclosure; and FIGS. 11A-11H illustrate auto-correlation and cross-correlation for preamble sequences according to embodiments of the present disclosure.

DETAILED DESCRIPTION OF THE INVENTION

FIGS. 1 through 11H, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications network.

Figure 1:
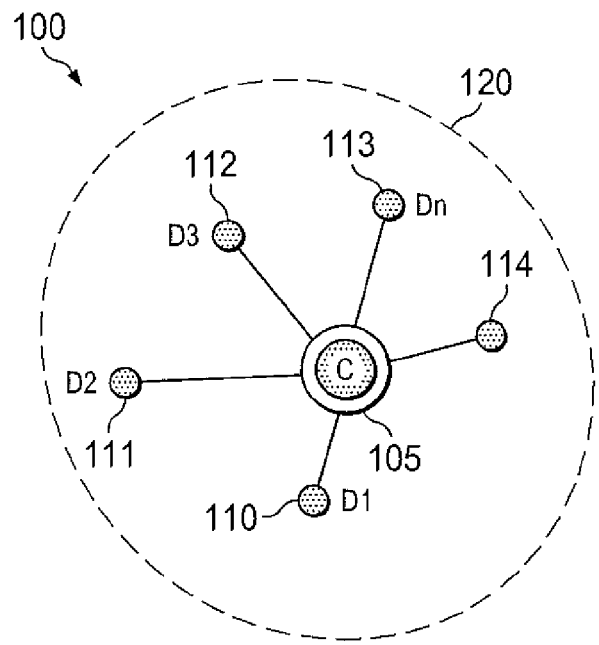
FIG. 1 illustrates an example body area network according to an exemplary embodiment of the disclosure.

FIG. 1 illustrates an example body area network according to an exemplary embodiment of the disclosure. The embodiment of the BAN 100 shown in FIG. 1 is for illustration only. Other embodiments could be used without departing from the scope of this disclosure.

The BAN 100 includes a central device 105 and a number of secondary devices 110-114. The secondary devices 110-114 are each configured to couple, or "pair," with the central device 105. When one or more secondary devices 110-114 pair with the central device 105, the central device 105 and paired secondary devices 110-114 form a piconet 120. The devices 105 and 110-114 in the piconet 120 can communicate with each other via a wireless communication. It will be understood that illustration of five (5) secondary devices in a piconet is for example purposes only and the piconet can include any number of secondary devices without departing from the scope of this disclosure.

The central device 105 can be configured to pair with one or more compatible secondary devices 110-114 within a coverage area of piconet 120, also referred to as a cell. A dotted line shows the approximate extents of coverage areas of the piconet 120, which are shown as approximately elliptical for the purposes of illustration and explanation only. It should be clearly understood that the coverage area associated with the central device 105, for example, coverage area of the piconet 120, may have other shapes, including irregular shapes, depending upon the configuration of the central device 105 and variations in the radio environment associated with natural and man-made obstructions. The coverage area of the piconet 120 can vary in size based on the transmit power and the receive power of the central device 105. For example, the central device 105 can be configured to pair with a number of secondary devices 110-114 located within a range from less than one (<1) meter to five (5) meters. It will be understood that illustration of the range from less than one (<1) meter to five (5) meters is for example purposes only and other ranges could be used without departing from the scope of this disclosure.

When paired, the central device 105 can send data to each of the secondary devices 110-114. The central device 105 can send the data individually, collectively, or to select groups of the secondary devices 110-114. For example, central device 105 can send data to secondary device D1 110 individually. Additionally, central device 105 can send beacons to all secondary devices D1 110-114 substantially simultaneously to establish frame structure, provide contention access period and do resource allocation.

Furthermore, when paired, the central device 105 can receive data from each of the secondary devices 110-114. The central device 105 can receive the data individually from one of the secondary devices 110-114 at time. For example, central device 105 can receive data from secondary device D1 110 individually.

Figure 2A:
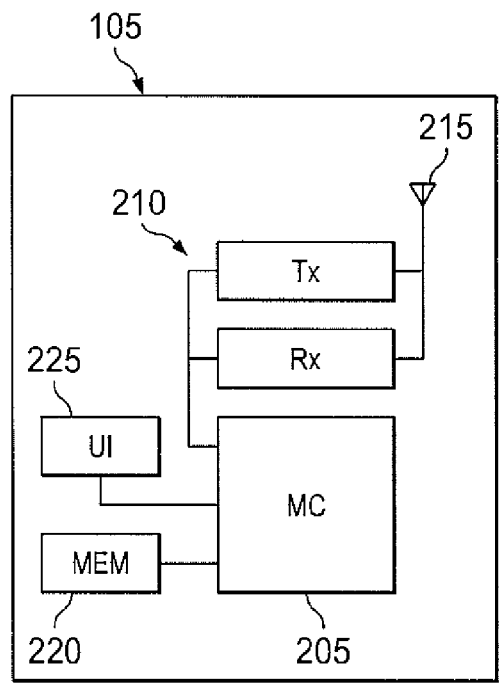
FIG. 2A illustrates a central device according to embodiments of the present disclosure.

FIG. 2A illustrates a central device according to embodiments of the present disclosure. The central device 105 shown in FIG. 2A is for illustration only. Other embodiments could be used without departing from the scope of this disclosure.

The central device 105 can be any type of electronic device capable of controlling one or more secondary devices 110-114 when paired with the secondary device 110-114. For example and not limitation, the central device 105 can be a cellular phone, Personal Data Assistant (PDA), a smart phone, portable computer, media player (e.g., an MP3 player or the like), a headset, or a media device (e.g., a video recorder or the like).

The central device 105 can include a microcontroller 205. The microcontroller 205 can be a processor or processor array configured to control the operations of the central device 105. In some embodiments, the microcontroller 205 is configured to pair central device 105 with one or more secondary devices 110-114.

The central device 105 also can include a transceiver 210 coupled to the microcontroller 205. In some embodiments, the transceiver 210 can be a main transmission/reception device for central device 105 and couples to the microcontroller 205 via an interface (not illustrated) that is adapted to enable the microcontroller 205 to use the transceiver 210. The transceiver 210 includes a transmit path (Tx) configured to transmit data signals and messages to the secondary devices 110-114 via one or more antenna 215. The transceiver 210 also includes a receive path (Rx) configured to receive data signals and messages from the secondary devices 110-114 via the antenna 215. In some embodiments, not specifically illustrated, the central device 105 includes a transmitter and a receiver as separate components.

The central device 105 also includes a memory 220. According to some embodiments, microcontroller 205 is operable to store information in the memory 220. Memory 220 can be any computer readable medium, for example, the memory 220 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. Memory 220 comprises a random access memory (RAM) and another part of memory 220 comprises a Flash memory, which acts as a read-only memory (ROM). In some such embodiments, the microcontroller 205 is configured to execute a plurality of instructions stored in a memory (not illustrated) configured to cause the microcontroller 205 to perform a number of operations of the central device 105.

In some embodiments, the central device 105 includes a User Interface (UI) 225. The UI 225 is coupled to the microcontroller 205. The UI 225 is configured to receive one or more inputs from a user in order to direct a function of the central device 105. For example and not limitation, the UI 225 can be configured to place the central device 105 in a pair mode such that the central device 105 commences a search operation for secondary devices 110-114 and pairs with one or more of the secondary devices 110-114 located within the coverage area 120. In some embodiments, the UI 225 can be an Input/Output (I/O) port adapted to couple to an external device, such as, for example, a personal computer, such that the user can use the external device to direct operations or store data, such as, for example, media data, in the central device 105.

Figure 2B:
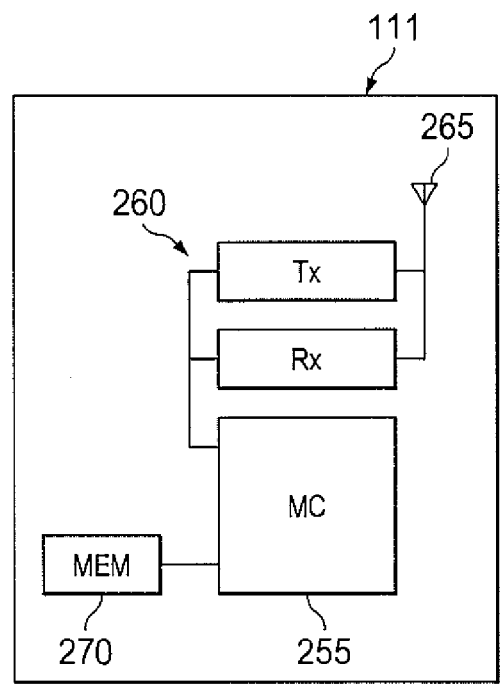
FIG. 2B illustrates a secondary device according to embodiments of the present disclosure.

FIG. 2B illustrates a secondary device according to embodiments of the present disclosure. The secondary device 110 shown in FIG. 2B is for illustration only. Other embodiments could be used without departing from the scope of this disclosure.

The secondary device 110 can be any type of electronic device capable of pairing with the central device 105. For example and not limitation, the secondary device 105 can be a health monitor device, a sensor, an access point, a remote control, a personal storage device, a video display device, a remote beam-finder, a global positioning system device, a cellular phone, Personal Data Assistant (PDA), a smart phone, portable computer, media player (e.g., an MP3 player or the like), a headset, an automobile, or a media device (e.g., a video recorder or the like).

The secondary device 110 can include a microcontroller 255. In some embodiments, the microcontroller 255 can be a processor or processor array configured to control the operations of the secondary device 110. In some embodiments, the microcontroller 255 is configured to pair secondary device 110 with the central device 105.

The secondary device 110 also can include a transceiver 260 coupled to the microcontroller 255. In some embodiments, the transceiver 260 can be a main transmission/reception device for secondary device 110 and couples to the microcontroller 255 via an interface (not illustrated) that is adapted to enable the microcontroller 255 to use the transceiver 260. The transceiver 210 includes a transmit path (Tx) configured to transmit data signals and messages to the central device 105 via one or more antenna 265. The transceiver 260 also includes a receive path (Rx) configured to receive data signals and messages from the central device 105 via the antenna 265. In some embodiments, not specifically illustrated, the secondary device 110 includes a transmitter and a receiver as separate components.

The secondary device 110 also includes a memory 270. According to some embodiments, microcontroller 255 is operable to store information in the memory 270. Memory 270 can be any computer readable medium, for example, the memory 270 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. Memory 270 comprises a random access memory (RAM) and another part of memory 270 comprises a Flash memory, which acts as a read-only memory (ROM). In some such embodiments, the microcontroller 255 is configured to execute a plurality of instructions stored in a memory (not illustrated) configured to cause the microcontroller 255 to perform a number of operations of the secondary device 110.

In some embodiments, the microcontroller 255 is preconfigured to cause the secondary device 110 to pair with a central device 105. The secondary device 110 can pair with the central device 105 in response to a pairing signal received from the central device 105. In some embodiments, the secondary device 110 is configured to actively search and pair with the central device 105.

In some embodiments, the secondary device 110 includes a user interface (not illustrated). The user interface can be coupled to the microcontroller 255. The UI 255 is configured to receive one or more inputs from a user in order to direct a function of the secondary device 110. For example and not limitation, the user interface can be configured to place the secondary device 110 in a pair mode such that the secondary device 110 commences a search operation for central device 105. In some embodiments, the user interface can be an Input/Output (I/O) port adapted to couple to an external device, such as, for example, a personal computer, such that the user can use the external device to direct operations or store data, such as, for example, media data, in the secondary device 110.

The microcontroller 255 can be configured to be responsive to commands received from the central device 105. For example, the secondary device 110 can receive commands via antenna 265 and transceiver 260. The microcontroller 255 can interpret the commands and alter one or more functions of the secondary device 110 in response to the commands. As an additional example, the microcontroller 255 can direct a playback of a media file stored in memory 270 through a speaker (not illustrated) in the secondary device 110. As a further example, the microcontroller 255 can direct the transmission of data, such as, for example, stored in memory 270 or sensed via sensor (not illustrated), to the central device 105.

Figure 3:
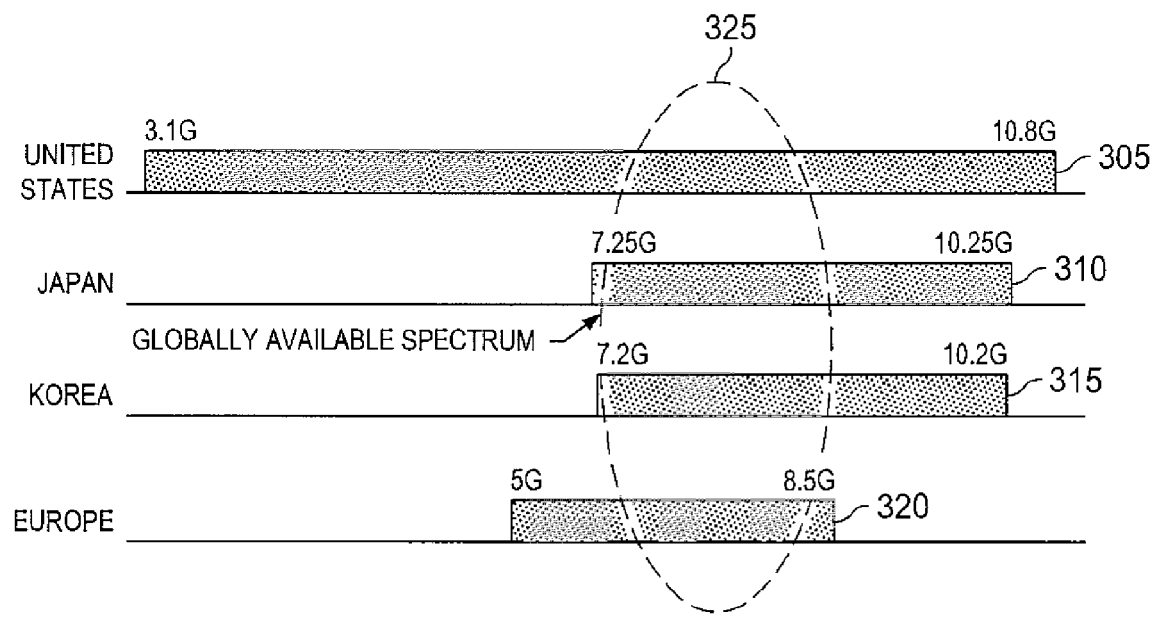
FIG. 3 illustrates an Ultra Wide Band world-wide spectrum according to an exemplary embodiment of the disclosure.

FIG. 3 illustrates an Ultra Wide Band world-wide spectrum according to an exemplary embodiment of the disclosure. The embodiment of the Ultra Wide Band (UWB) world-wide spectrum shown in FIG. 3 is for illustration only. Other embodiments could be used without departing from the scope of this disclosure.

IEEE 802.15.6, the contents of which are incorporated by reference in their entirety, is developing a standard for BAN and has proposed a co-existence requirement of at least 10 piconets to co-exist. UWB is very interesting for BAN due to the unlicensed band, low transmit power, and ability to work under interference due to large bandwidth. UWB, however, is unable to support more than two bands globally due to the 500 MHz requirement. Accordingly, when using UWB, at least ten piconets need to operate within two frequency bands, which implies that at least five piconets may need to operate in the same band at the same time.

The BAN is configured for a broad range of possible devices, both central devices 105 and secondary devices 110-114. The BAN can be configured to utilize a low power environment for operation on, in and around the human body. It will be understood that BAN operation is not limited to operation on, in and around the human body, but can be applicable to other bodies, such as, for example, animals, and man-made objects. The BAN also is configured for a broad range of media types and a variety of applications including medical, consumer electronics and personal entertainment. In some embodiments, therefore, the central device 105 and secondary devices 110-114 can be configured to use UWB.

In some embodiments, at least ten (10) piconets can operate within a 6×6×6 meter area. For example, in some embodiments, at least sixteen (16) piconets can operate within a 6×6×6 meter area. Additionally, the piconets can be configured to operate globally.

The UWB spectrum, however, is restricted for use in some countries. For example, the United States UWB spectrum 305 comprises a range from 3.1 GHz to 10.6 GHz. The Japanese UWB spectrum 310 comprises a range from 7.25 GHz to 10.25 GHz. The Korean UWB spectrum 315 comprises a range from 7.2 GHz to 10.2 GHz. The European UWB spectrum 320 comprises a range from 6 GHz to 8.5 GHz. Accordingly, a common globally available UWB spectrum 325 is approximately 1.25 GHz wide (e.g., a maximum of 8.5 GHz in the European UWB spectrum 320—the minimum of 7.25 GHz in the Japanese UWB spectrum 310).

In some embodiments, each piconet operates within a bandwidth of five hundred Megahertz (500 MHz). Therefore, the ten or more piconets are configured to operate within two (2) frequency bands of 500 MHz each. As such, the piconets may have overlapping resources in time and frequency and may cause interference in operation. Since each piconet can operate independently of other piconets within an area, coordination of time or frequency resources between piconets can be challenging.

Figure 4:
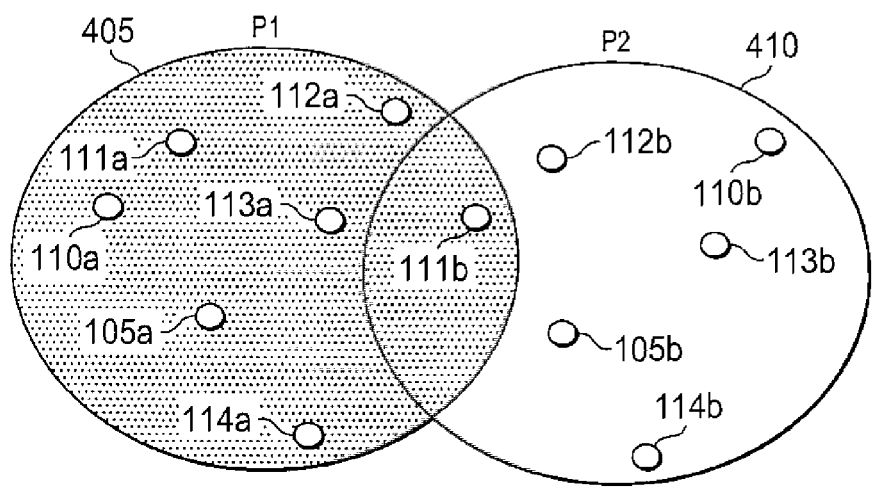
FIG. 4 illustrates two piconets operating in close proximity according to embodiments of the present disclosure.

FIG. 4 illustrates two piconets operating in close proximity according to embodiments of the present disclosure. The piconets shown in FIG. 4 are for illustration only. Other embodiments could be used without departing from the scope of this disclosure.

In the example illustrated in FIG. 4, Piconets P1 405 and P2 410 are operating in close proximity to each other. For example, P1 405 and P2 410 can be located within a 6×6×6 meter area. P1 405 includes a central device 105a and a number of secondary devices 110a-114a. P2 410 includes a central device 105b and a number of secondary devices 110b-114b.

Secondary device 111b is paired with central device 105b. As such, secondary device is located in and communicates in P2 410. Secondary device 111b can be, for example, an MP3 player and central device 105b can be, for example, a smart phone. Secondary device 111b is located such that secondary device 111b also is within a coverage area of P1 405. Therefore, secondary device 111b can receive (e.g., "hear") signals from central device 105a. When P1 405 and P2 410 share the same frequency band and same time, the signals that secondary device 111b receives from central device 105a can be interference signals. That is, secondary device 111b can experience inter-piconet interference.

Figure 5:
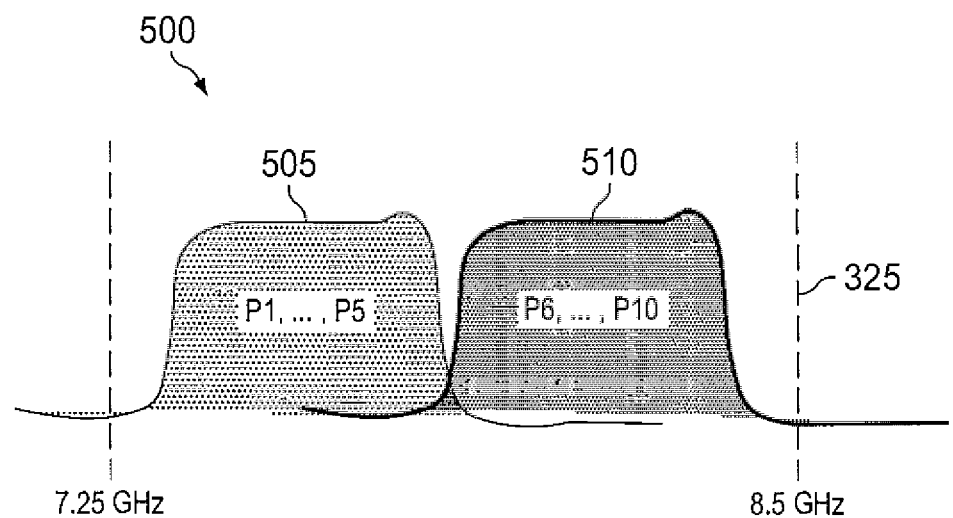
FIG. 5 illustrates a piconet distribution for a bandwidth according to embodiments of the present disclosure.

FIG. 5 illustrates a piconet distribution for a bandwidth according to embodiments of the present disclosure. The embodiment of the piconet distribution 500 shown in FIG. 5 is for illustration only. Other embodiments of the piconet distribution 500 could be used without departing from the scope of this disclosure.

In some embodiments, five (5) piconets can operate within the same operating band at the same time. For example, P1 through P5 can operate at the same time in a first bandwidth 505 while P6 through P10 can operate at the same time in a second bandwidth 510. Therefore, receivers in the secondary devices 110-114 for each respective piconet (P1-P5 for the first bandwidth 505 and P6-P10 for the second bandwidth 510) can receive transmissions from other piconets at the same time. Therefore, the piconets can be configured to operate at the same time and within the respective bandwidth 505, 510 by using interference mitigation techniques that can include one of a low duty cycle, a modified preamble designed to operate under interference, and an error recovery mechanism in order to reduce interference resulting from the signals from other piconets operating at the same time within the same frequency bandwidth.

Two processes exist for attaining low duty cycle for BAN. The first process is at the MAC layer (macro) whereby spacing between transmissions is increases. The second process is at the Physical (PRY) layer (micro) whereby pulse-based transmission is used such that only a part of the symbol contains transmission.

Figure 6:
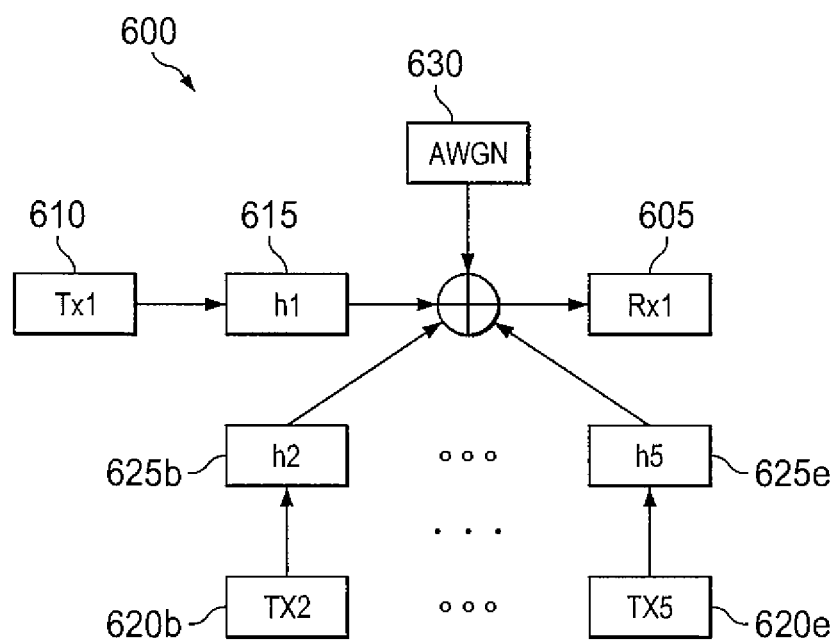
FIG. 6 illustrates a multipath scenario of piconet coexistence according to embodiments of the present disclosure.

FIG. 6 illustrates piconet coexistence according to embodiments of the present disclosure. The embodiment of the piconet coexistence 600 shown in FIG. 6 is for illustration only. Other embodiments could be used without departing from the scope of this disclosure.

A receiver 605 is paired with transmitter 610 such that the receiver 605 and transmitter 610 are part of a piconet (such as, for example, piconet P1 410 shown in FIG. 4). For example, receiver 605 can be located in secondary device 111b and transmitter 610 can be located in central device 105b. It will be understood that illustration of the receiver 605 located in the secondary device 111b and the transmitter 610 located in the central device 105b is for example purpose only and embodiments wherein the receiver 605 is located in a central device and/or the transmitter 610 is located in a secondary device could be used without departing from the scope of this disclosure.

The receiver 605 receives communications from the transmitter 610 via a first channel (h1) 615. The receiver 605 also can hear (e.g., receives) communications from transmitters 620b-e located in other piconets (P2-P5). For example, a transmitter (TX2) 620b, located in piconet (P2) sends transmissions along a second channel (h2) 625b. Additionally another transmitter (TX5) 620e located in piconet (P5) sends transmissions along a fifth channel (h5) 625e. In the example illustrated in FIG. 6, additional interfering transmitters (e.g., transmitters 620c-d) located in additional proximate piconets (P3-P4 and associated channels 625c-d) communicating along respective channels are not illustrated for clarity purposes but are represented by ellipsis ("..."). The receiver 605 also hears Additive White Gaussian Noise (AWGN), as represented by the AWGN channel 630. Depending upon the distances, the information received by the receiver 605 can include communications from the transmitter 610 and signals from channels h2 625b through h5 625e and AWGN 630. Therefore, the receiver experiences interference from h2 625b through 625e and AWGN 630. Accordingly, in some embodiments, the transmitter 610 and receiver 605 in each piconet are configured to perform interference mitigation by utilizing one or more of a low duty cycle, a modified preamble design, and an error recovery mechanism.

Figure 7:
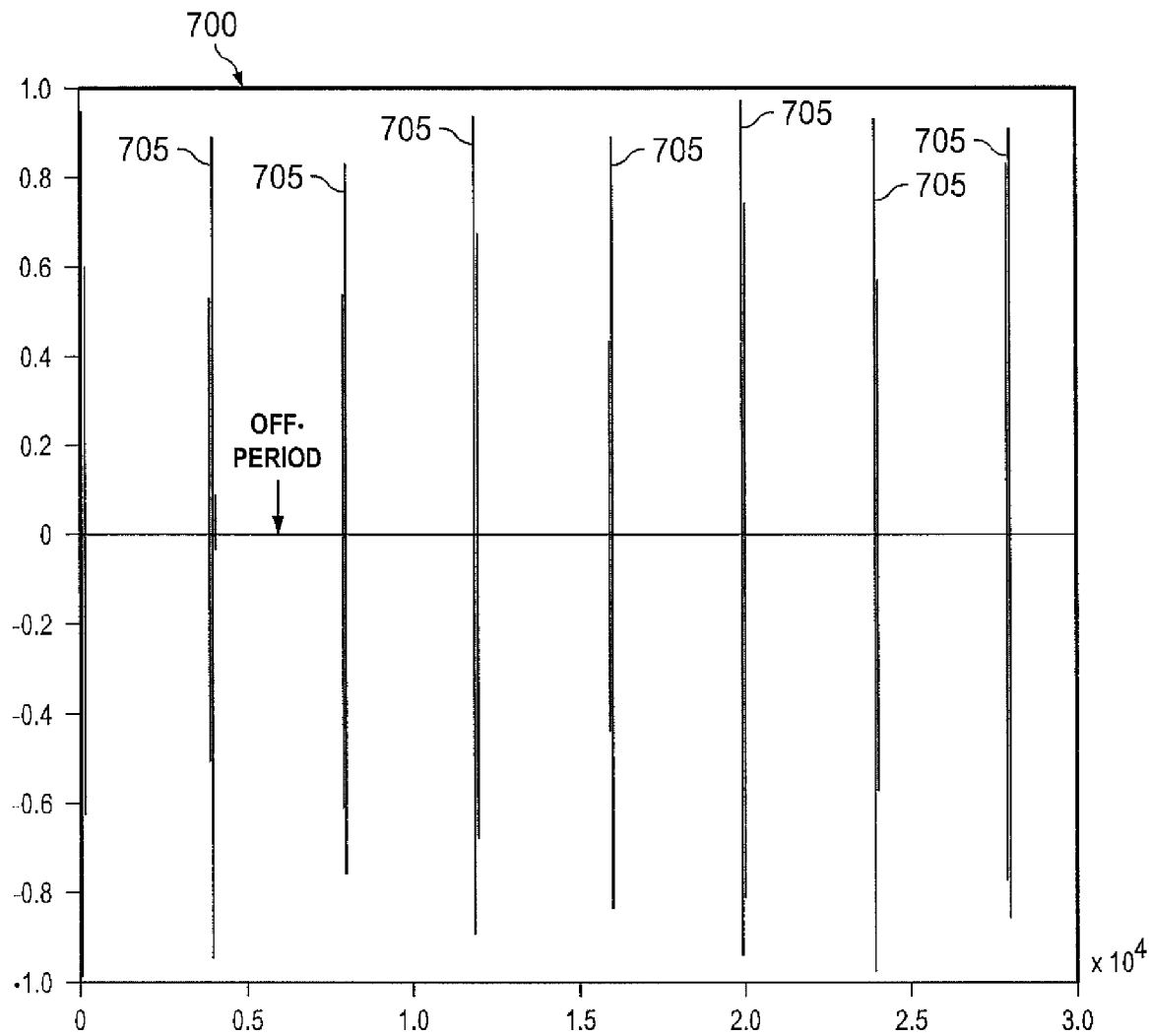
FIG. 7 illustrates a low duty cycle in the PHY layer according to embodiments of the present disclosure.

FIG. 7 illustrates a low duty cycle in the PHY layer according to embodiments of the present disclosure. The embodiment of the duty cycle 700 shown in FIG. 7 is for illustration only and could be extended to the MAC layer duty cycling as well. Other embodiments could be used without departing from the scope of this disclosure.

In some embodiments, each piconet can be configured to utilize a duty cycle. For example, each of the devices in P1 405 can be configured to utilize duty cycling with modulation such as, for example, a phase shift keying or an On-Off Keying (OOK) modulation technique in order to meet low power requirements for BAN. Using OOK, for example, the central device 105 can power down (e.g., sleep) the transmitter, and, optionally, additional electronic components, during OFF-periods of time. During ON-periods, the central device 105 can power-up the transmitter and, optionally, additional electronic components that were powered down. The OOK can be performed within symbols within the PHY layer and across packets in the mac layer. In some embodiments, the central device 105 instructs the secondary devices 110-114 to perform OOK in coordination with the central device 105.

Using duty cycling, an increased resistance to interference from multiple piconets can be provided. For example, P1 can use a four percent (4%) duty cycle for the ON-period. The 4% duty cycle can roughly equate to a point sixty-four percentage (0.64%) probability that P1 will experience interference from the four additional piconets (P2-P5).

In FIG. 7, the spikes 705 represent an ON-time used by a first piconet (such as, for example, P1 405) to send data when P1 405 uses a 4% duty cycle within symbols in the PHY layer for transmission with pulse modulation using OOK. Therefore, each of the piconets, P1-P5, can use, for example, a 4% duty cycle for transmission with pulse modulation using OOK. Accordingly, if P1-P5 are uncoordinated and include random offsets with respect to each other, the probability for interference between two or more of the piconets, P1-P5, can be relatively small.

Figure 8:
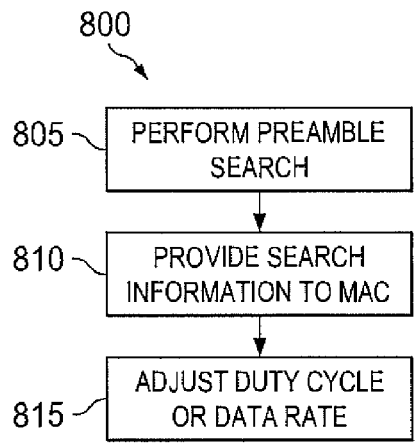
FIG. 8 illustrates a method for adjusting a low duty cycle or data rate according to embodiments of the present disclosure.
Figure 11F:
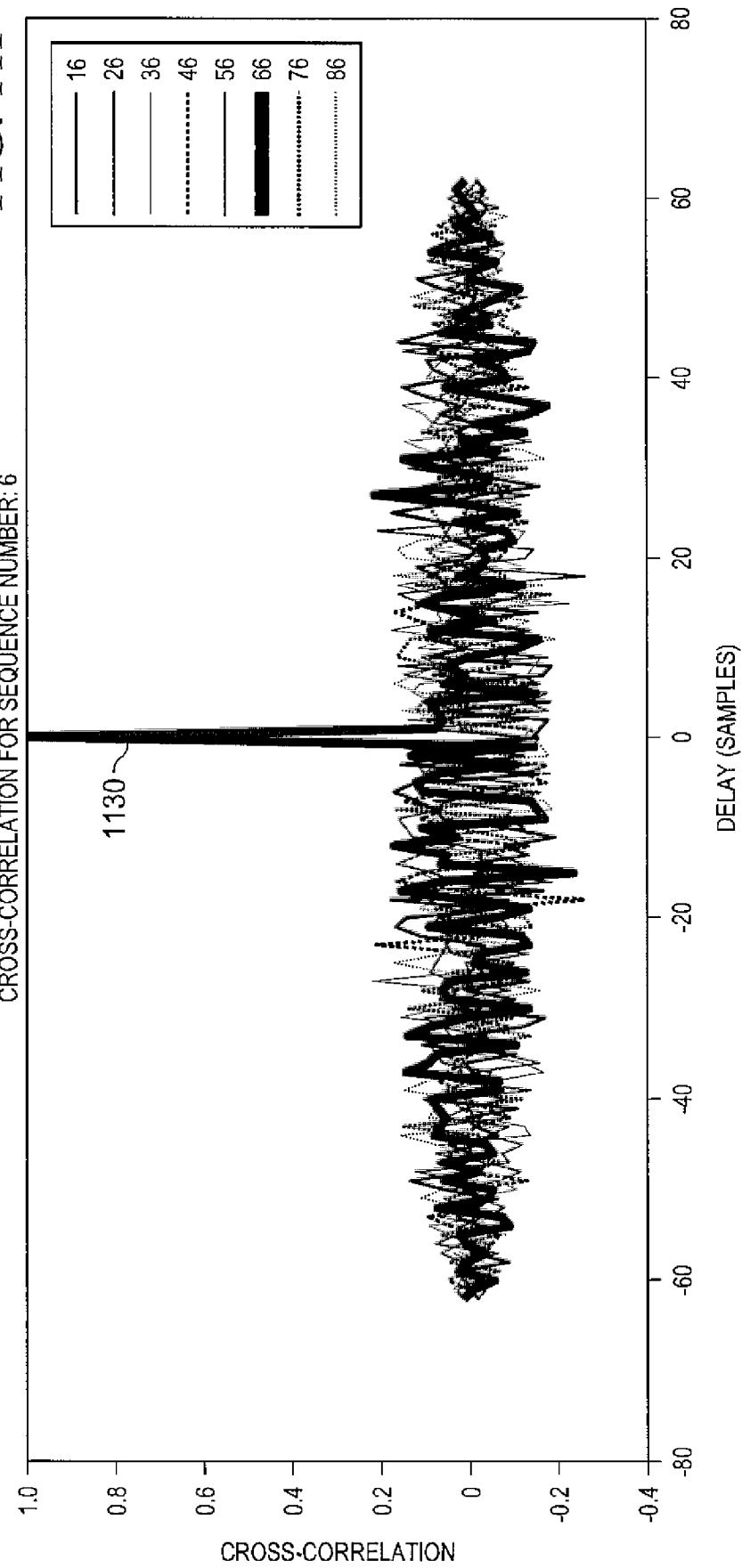
Figure 11H:
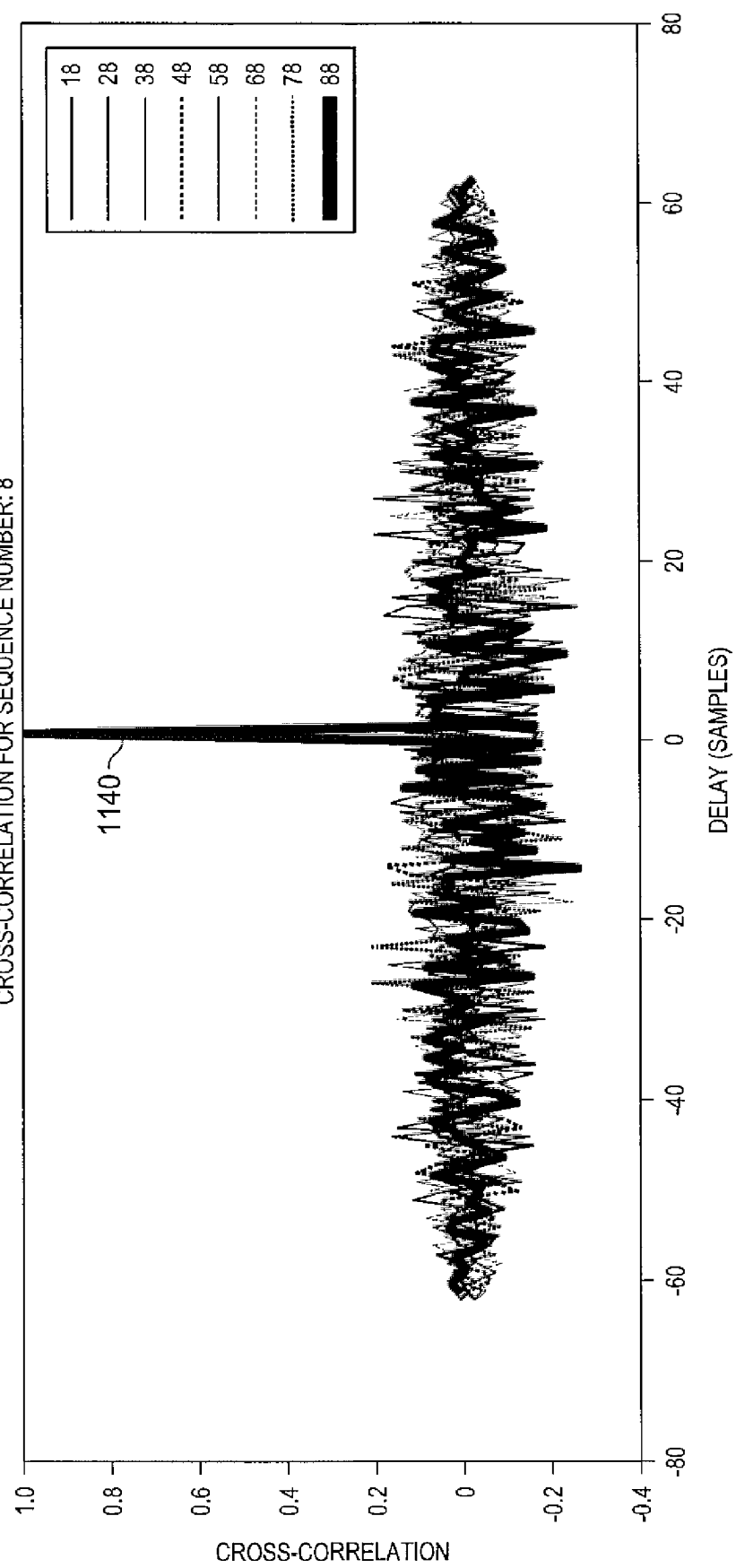

FIG. 8 illustrates a method for adjusting a low duty cycle or data rate according to embodiments of the present disclosure. The process 800 shown in FIG. 8 is for illustration only. Other embodiments could be used without departing from the scope of this disclosure.

In some embodiments, the low duty cycle and data rates can be varied (such as, adjusted) based on observed interference. For example, to determine if significant interference from nearby piconets exists, P1 405 can be configured to detect one or more nearby piconets, such as, for example, P2-P5. In block 805, P1 405 performs a search for preamble search patterns for piconets located in proximity to P1 405. P1 405 can perform the search during idle time periods or during piconet formation. If P1 405 detects one or more preamble search patterns corresponding to one or more of P2-P5, P1 405 can provide interference information to the MAC layer in block 810. The interference information can include a number of interfering piconets with corresponding preamble search patterns. In response to receiving the interference information, in block 815, the MAC layer can adjust the low duty cycle, the data rate, or both, for P1 405 to better enable operation of P1 405 to coexist with the detected piconets in proximity to P1 405.

FIG. 9 illustrates a timing offset for coexistence of a number of piconets operating within the same time and bandwidth according to embodiments of the present disclosure. The embodiment of the timing offset 900 shown in FIG. 9 is for illustration only. Other embodiments could be used without departing from the scope of this disclosure.

In some embodiments, the piconets (P1-P5) each utilize an interference mitigation preamble design. The preamble included in the beginning of a data transmission. The preamble helps synchronize to the correct network. The preamble design illustrates five (5) sequences configured to enable the piconets (P1-P5) to operate within a frequency band (such as, for example, bandwidth 505 in FIG. 5) without causing interference between the piconets. The preamble design, however, includes eight (8) sequences.

Further, the sequences for the preamble design can include the following properties: Auto-correlation and Cross-correlation. Auto-correlation is the ability by a receiver in a piconet (for example, receiver 605 in P1 405) to distinguish a signal from the transmitter 610 in P1 405 with time-shifted versions of the signal from the transmitter 610 in P1 405. That is, the preamble sequence is configured to enable the receiver 605 in P1 405 to be able to find its own piconet sequence in presence of noise and multipath effects. Cross-correlation is the ability of the receiver 605 in P1 405 to distinguish a signal from the transmitter 610 in P1 405 from set of time-shifted versions of other signals (e.g., from one or more of P2-P5) in a set. That is, the preamble sequence further is configured to enable the receiver 605 in P1 405 to find its own sequence in presence of other sequences, noise and multipath effects.

The preamble design, in general, can be based on any one of: Walsh Codes, Gold codes and Kasami codes for binary sequences; and Zadoff-Chu codes and Generalized Chirp Like codes for complex sequences. For example, the preamble design can be based on a Kasami code. However, for BAN, it is important to design codes that work under non-synchronized conditions and have good auto- and—cross-correlation properties within the code set. Since BAN also is intended to be low power, BAN supports non-coherent receivers where only the energy of the signal is received. Therefore, it is not possible to use complex sequences such as Zadoff-Chu for BAN.

Based on the constraints for preamble design for BAN, such as: (a) requirement for at least ten piconets co-existing; (b) availability of two frequency bands, implying at least five (5) piconets per band; (c) choice of using non-coherent receivers; and (d) a need to have good auto-correlation and cross-correlation properties, some embodiments utilize Kasami sequences. Kasami sequences have optimal cross-correlation values touching the Welch lower bound, and are good for asynchronous communication. The Kasami short set sequences were selected and searched based on the preamble design constraints for BAN to obtain the following eight sequences:

Sequence 1: 1 1 1 1 1 1 0 1 0 1 0 1 1 0 0 1 1 0 1 1 1 0 1 1 0 1 0 0 1 0 0 1 1 1 0 0 0 1 0 1 1 1 1 0 0 1 0 1 0 0 0 1 1 0 0 0 0 1 0 0 0 0 0

Sequence 2: 0 0 0 1 1 0 0 0 1 0 0 1 0 0 1 0 0 0 1 0 1 1 0 0 0 1 1 0 0 1 1 1 1 0 0 1 1 0 0 1 0 1 0 1 1 1 0 0 0 1 1 0 1 0 1 0 1 0 1 0 0 1 0

Sequence 3: 1 0 0 0 1 1 1 1 1 0 1 1 1 1 0 0 0 1 1 1 0 0 0 0 1 1 0 1 1 1 1 0 1 1 1 0 1 0 1 1 1 0 1 1 1 0 0 1 1 0 1 0 0 0 0 1 0 0 1 1 0 0 1

Sequence 4: 0 1 0 0 0 1 0 0 0 0 1 0 1 0 1 1 0 1 0 1 1 1 1 0 1 0 0 0 0 0 1 0 0 1 0 1 0 0 1 0 1 1 0 0 1 0 1 1 0 1 0 0 0 1 0 0 1 1 1 1 1 0 0

Sequence 5: 1 0 1 0 0 0 0 1 1 1 1 0 0 0 0 0 1 1 0 0 1 0 0 1 1 0 1 0 1 1 0 0 0 0 0 0 1 1 1 0 0 1 1 1 0 0 1 0 0 0 1 1 0 1 1 0 0 0 0 1 1 1 0

Sequence 6: 1 1 0 1 0 0 1 1 0 0 0 0 0 1 0 1 0 0 0 0 0 0 1 0 0 0 1 1 1 0 1 1 0 0 1 0 0 0 0 0 0 0 1 0 1 1 1 0 1 0 0 0 1 1 1 1 0 1 1 0 1 1 1

Sequence 7: 0 1 1 0 1 0 1 0 0 1 1 1 0 1 1 1 1 1 0 0 1 1 1 1 1 1 1 0 0 0 0 1 0 1 1 0 1 1 1 0 0 0 0 0 0 0 0 1 1 0 1 0 0 1 1 1 1 0 1 0 1 1

Sequence 8: 0 0 1 1 0 1 1 0 1 1 0 0 1 1 1 0 1 0 0 1 0 1 0 1 0 0 0 1 0 1 0 1 0 1 1 1 1 1 0 0 1 0 0 1 0 1 1 1 1 1 1 1 1 1 0 1 1 0 0 0 1 0 1

These eight (8) sequences can be used for preamble co-existence, for example, for IEEE 802.15.6 BAN standardization.

FIG. 10A illustrates a packet structure according to embodiments of the present disclosure. The embodiment of the packet structure 1005 shown in FIG. 10A is for illustration only. Other embodiments could be used without departing from the scope of this disclosure.

The packet structure 1005 is configured for low duty cycle interference mitigation and piconet coexistence. The packet structure 1005 includes a preamble 1010, a header 1015 and a payload 1020. The preamble 1010 can be one of eight 63-bit Kasami sequences for piconet co-existence such as OOK and can be repeated multiple times.

FIG. 10B illustrates eight preamble codes based on a Kasami code according to embodiments of the present disclosure. The embodiment of the preamble codes 1030 shown in FIG. 10B is for illustration only. For example, the '0' and '1' pattern can be interchanged. Additionally, a '−1' and '1' can be used in place of '0' and '1' for coherent detection, and BPSK modulation. Further, other embodiments could be used without departing from the scope of this disclosure.

The example shown in FIG. 10B illustrates the specified eight (8) preamble sequences that include high auto-correlation and low cross-correlation. The specified codes, based on the Kasami small set family, include a length of sixty-three (63). FIGS. 11A-11H illustrate the auto-correlation and cross-correlation for each of the codes shown in the example illustrated in FIG. 10B.

In the legend, the first number shows the interfering piconet and the second number shows the desired piconet. For example, in FIG. 11A, the bottom number in the legend is '81'. This number ('81') corresponds to interfering piconet '8' (e.g., signal from P8) and desired piconet '1' (e.g., signal from P1). If the interfering piconet and desired piconet are the same, the plot shows the auto-correlation. Alternatively, if the interfering piconet and desired piconet are not the same, the plot shows the cross-correlation between the codes. For example, signal spike 1105 corresponds to auto-correlation of P1 (e.g., P1's ability to distinguish P1's own signal from a time-shifted versions of its own signal). Further, signal spike 1110 corresponds to auto-correlation of P2 (e.g., P2's ability to distinguish P2's own signal from a time-shifted versions of its own signal); signal spike 1115 corresponds to auto-correlation of P3 (e.g., P3's ability to distinguish P3's own signal from a time-shifted versions of its own signal); signal spike 1120 corresponds to auto-correlation of P4 (e.g., P4's ability to distinguish P4's own signal from a time-shifted versions of its own signal); signal spike 1125 corresponds to auto-correlation of P5 (e.g., P5's ability to distinguish P5's own signal from a time-shifted versions of its own signal); signal spike 1130 corresponds to auto-correlation of P6 (e.g., P6's ability to distinguish P6's own signal from a time-shifted versions of its own signal); signal spike 1135 corresponds to auto-correlation of P7 (e.g., P7's ability to distinguish P7's own signal from a time-shifted versions of its own signal); and signal spike 1140 corresponds to auto-correlation of P8 (e.g., P8's ability to distinguish P8's own signal from a time-shifted versions of its own signal). As can be seen from the figures, the specified preamble patterns include excellent cross-correlation properties, enabling asynchronous operation between the piconets.

Furthermore, the preamble design with eight (8) sequences is configured for use in one frequency band, such as, for example, frequency bandwidth 505 in FIG. 5. Therefore, these codes could be repeated for the other frequency band (e.g., frequency bandwidth 510 in FIG. 5), thus providing up to sixteen (16) simultaneously operating piconets (P1-P8 and P9-P16) for BAN, while maintaining low power requirements. In some embodiments, in order to help with adjacent channel rejection, and adjacent band ID could also be added into the preamble ID, thereby providing 16 unique preamble IDs.

In some embodiments, the devices in P1 405 are configured to perform a combination of interference mitigation techniques. In some such embodiments, although duty cycling operations and preamble sequence can minimize the chance of interference and misdetection of the desired piconet preamble, P1 405 performs additional steps in order to recover from an error in preamble detection. For example, in case of strong interference or if the preamble length, or the number of preamble repetitions, is shortened to save power, P1 405 can be configured to perform one or more of:

1) a masking operation: the masking operation can include applying an 8-bit CRC that can be added for the header for the communication and masked with the preamble ID, wherein a frequency band choice can be included as part of the header; and
2) an offset operation: an additional offset can be added to a scrambler seed code in the header and this offset can be linked to the preamble ID; and
3) explicitly signaling the preamble ID in the header. However, the receiver may need to decode the header completely in order to know whether the preamble is for the desired piconet.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A device for use in a body area network capable of low power communications, the device comprising:
   a controller configured to couple to at least one secondary device, the device and at least one secondary device coupled in a first piconet; and
   a transmitter configured to communicate with the at least one secondary device via a wireless communication channel, wherein the controller is configured to perform an interference mitigation technique, the interference mitigation technique comprising:
   selecting a preamble sequence of a plurality of preamble sequences designed to operate under interference, wherein the transmitter is configured to perform a low duty cycling operation on the selected preamble sequence.

2. The device as set forth in claim 1, wherein the wireless communication channel is an ultra-wide band communication.

3. The device as set forth in claim 1, wherein the preamble sequences are configured to enable at least five piconets to operate within a close proximity and using a same frequency band.

4. The device as set forth in claim 1, wherein the preamble sequences are based on one of a number of Kasami short sequences.

5. The device as set forth in claim 4, wherein the number of Kasami short sequences comprise:
   a first sequence defined as: 1 1 1 1 1 1 0 1 0 1 0 1 1 0 0 1 1 0 1 1 1 0 1 1 0 1 0 0 1 0 0 1 1 1 0 0 0 1 0 1 1 1 1 0 0 1 0 1 0 0 0 1 1 0 0 0 0 1 0 0 0 0 0;
   a second sequence defined as: 0 0 0 1 1 0 0 0 1 0 0 1 0 0 1 0 0 0 1 0 1 1 0 0 0 1 1 0 0 1 1 1 1 0 0 1 1 0 0 1 0 1 0 1 1 1 0 0 0 1 1 0 1 0 1 0 1 0 1 0 0 1 0;
   a third sequence defined as: 1 0 0 0 1 1 1 1 1 0 1 1 1 1 0 0 0 1 1 1 0 0 0 0 1 1 0 1 1 1 1 0 1 1 1 0 1 0 1 1 1 0 1 1 1 0 0 1 1 0 1 0 0 0 0 1 0 0 1 1 0 0 1;
   a forth sequence defined as: 0 1 0 0 0 1 0 0 0 0 0 1 0 1 1 0 1 0 1 1 1 1 0 1 0 0 0 0 0 1 0 0 1 0 1 0 0 1 0 1 1 0 0 1 0 1 1 0 1 0 0 0 1 0 0 1 1 1 1 1 0 0;
   a fifth sequence defined as: 1 0 1 0 0 0 0 1 1 1 1 0 0 0 0 0 1 1 0 0 1 0 0 1 1 0 1 0 1 1 0 0 0 0 0 0 1 1 1 0 0 1 1 1 0 0 1 0 0 0 1 1 0 1 1 0 0 0 0 1 1 1 0;
   a sixth sequence defined as: 1 1 0 1 0 0 1 1 0 0 0 0 0 1 0 1 0 0 0 0 0 0 1 0 0 0 1 1 1 0 1 1 0 0 1 0 0 0 0 0 0 0 1 0 1 1 1 0 1 0 0 0 1 1 1 1 0 1 1 0 1 1 1;
   a seventh sequence defined as: 0 1 1 0 1 0 1 0 0 1 1 1 0 1 1 1 1 1 1 0 0 1 1 1 1 1 1 1 0 0 0 0 1 0 1 1 0 1 1 1 1 0 0 0 0 0 0 0 0 1 1 0 1 0 0 1 1 1 1 0 1 0 1 1; and
   an eighth sequence defined as: 0 0 1 1 0 1 1 0 1 1 0 0 1 1 1 0 1 0 0 1 0 1 0 1 0 0 0 1 0 1 0 1 0 1 1 1 1 1 0 0 1 0 0 1 0 1 1 1 1 1 1 1 1 1 0 1 1 0 0 0 1 0 1.

6. The device as set forth in claim 1, wherein the low duty cycling operation comprises:
   in a physical layer, on-off keying within a symbol; and
   in a media access control layer, on-off keying across packets.

7. The device as set forth in claim 1, wherein the controller is configured to:
   detect additional piconets during idle periods of operation;
   inform a MAC layer regarding a number of detected additional piconets; and
   adjust at least one of: a low duty cycle of the transmitter, and a data rate of the transmitter.

8. The device as set forth in claim 7, wherein the controller is configured to one of:

lower the at least one of the low duty cycle and the data rate when the number of detected additional piconets has increased; and increase the at least one of the low duty cycle and the data rate when the number of detected additional piconets has decreased.

9. The device as set forth in claim 1, wherein the controller further is configured to perform at least one of:

adding a cyclic redundancy check (CRC) code in a header of a communication from the transmitter to the at least one secondary device, wherein the CRC is masked with a preamble identifier;

adding an offset value to a scrambler seed code in the header; and explicitly signaling the preamble identifier in the header.

10. An apparatus for use in a body area network comprising a plurality of devices capable of low power communications, the apparatus comprising:

a processor configured to pair a first device with least one secondary device, wherein the first device and at least one secondary device are paired in a first piconet; and an interface adapted to couple the processor to a transceiver configured to communicate with the at least one secondary device via a wireless communication channel, wherein the processor is configured to perform an interference mitigation technique, and wherein the interference mitigation technique comprises:

selecting a preamble sequence of a plurality of preamble sequences designed to operate under interference; and perform a low duty cycling operation on the selected preamble sequence.

11. The apparatus as set forth in claim 10, wherein the wireless communication channel is an ultra-wide band communication.

12. The apparatus as set forth in claim 10, wherein the preamble sequences are configured to enable at least five piconets to operate within a close proximity and using a same frequency band.

13. For use in a body area network capable of low power communications, a method of operating a piconet, the method comprising:

communicating, by a central device, with at least one paired device in the piconet;

operating in close proximity with a second device located in at least one adjacent piconet, the piconet and the adjacent piconet sharing a same frequency and same time; and performing an interference mitigation technique configured to reduce a probability that communications in the adjacent piconet will interfere with communications in the piconet, wherein the interference mitigation technique comprises selecting a preamble sequence of a plurality of preamble sequences designed to operate under interference, and performing a low duty cycling operation on selected preamble sequence of the plurality sequences.

14. The method as set forth in claim 13, wherein the at least one preamble sequence is configured to enable at least five piconets to operate within a close proximity and using a same frequency band.

15. The method as set forth in claim 13, wherein the low duty cycling operation comprises:

in a physical layer, on-off keying within a symbol; and in a media access control layer, on-off keying across packets.

16. The method as set forth in claim 13, further comprising detecting additional adjacent piconets during idle periods of operation.

17. The method as set forth in claim 16, further comprising changing a preamble search pattern to detect preambles corresponding to the additional adjacent piconets.

18. The method as set forth in claim 16, further comprising, in response to detecting at least one additional adjacent piconet, adjusting at least one of: a low duty cycle operation and a data rate.

19. The method as set forth in claim 18, wherein adjusting the at least one of the low duty cycle operation and the data rate comprises one of:

lowering the at least one of the low duty cycle and the data rate when a number of detected additional piconets increases; and increasing the at least one of the low duty cycle and the data rate when the number of detected additional piconets has decreased.

20. The method as set forth in claim 13, further comprising reducing, by the central device, an error recovery speed by at least one of:

adding a cyclic redundancy check (CRC) code in a header of a communication from the transmitter to the at least one secondary device, wherein the CRC is masked with a preamble identifier;

adding an offset value to a scrambler seed code in the header; and explicitly signaling the preamble identifier in the header.

* * * * *